C. W. WATTLEWORTH.
CORE FOR TIRES AND TIRE CARCASSES.
APPLICATION FILED AUG. 13, 1917.
1,283,998.
Patented Nov. 5, 1918.
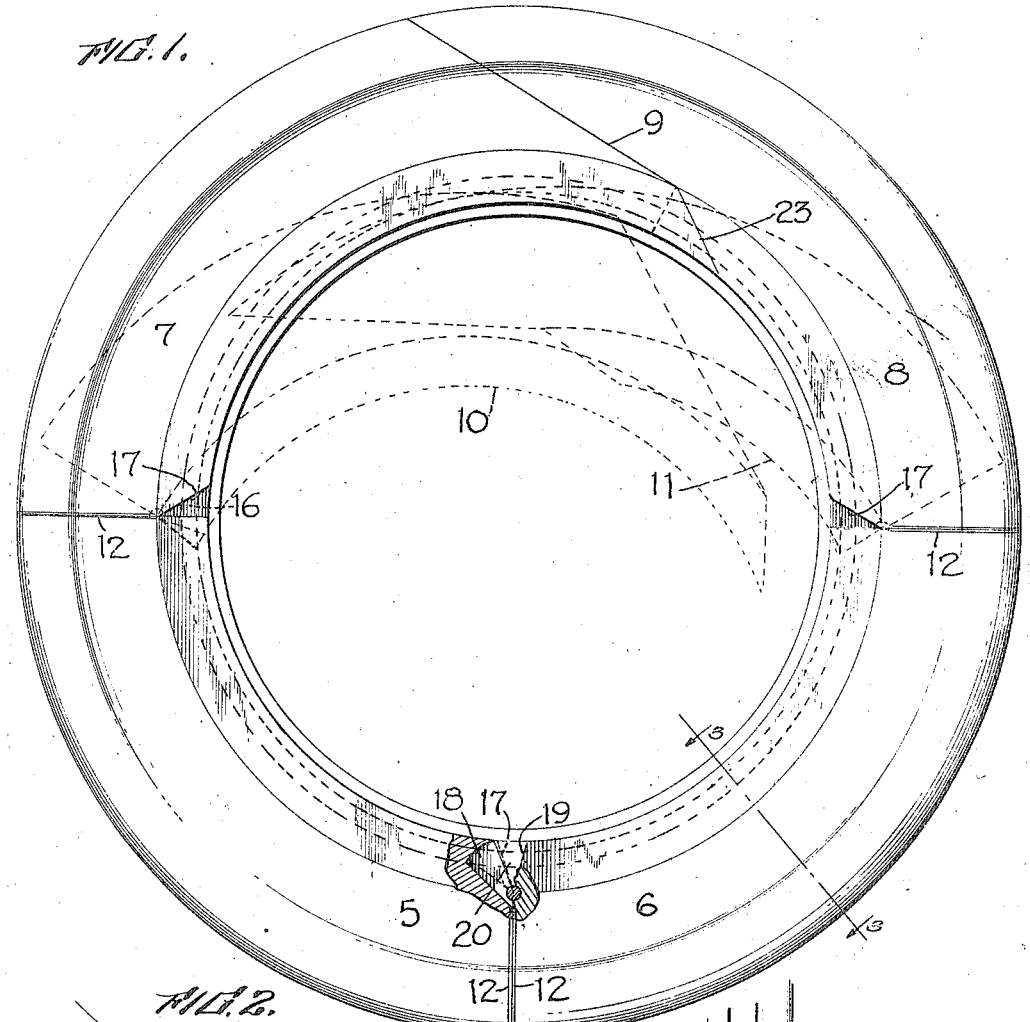
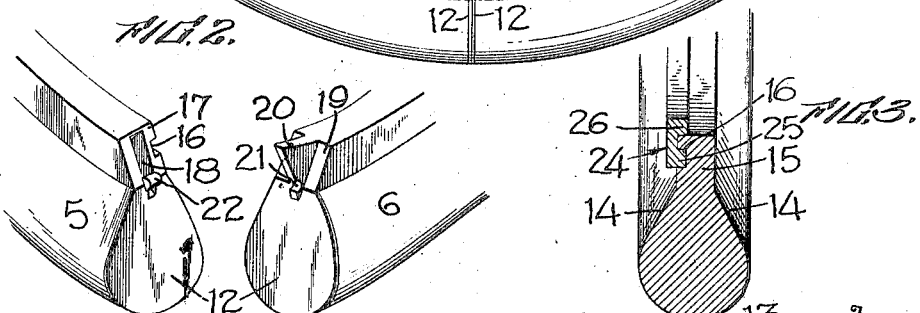
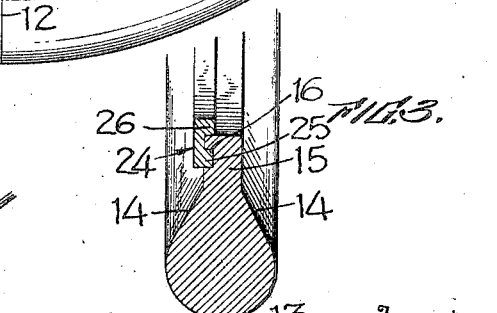
Inventor:
Charles Wattleworth.
By C. L. Landon
Attorney.
WITNESSES:

UNITED STATES PATENT OFFICE.

CHARLES W. WATTLEWORTH, OF AKRON, OHIO, ASSIGNOR TO THE GOODYEAR TIRE & RUBBER COMPANY, A CORPORATION OF OHIO.

CORE FOR TIRES AND TIRE-CARCASSES.

1,283,998.  Specification of Letters Patent.  Patented Nov. 5, 1918.

Application filed August 13, 1917. Serial No. 185,943.

*To all whom it may concern:*

Be it known that I, CHARLES W. WATTLEWORTH, a subject of the King of Great Britain, residing at Akron, in the county of Summit and State of Ohio, have invented new and useful Improvements in Cores for Tires and Tire-Carcasses, of which the following is a specification.

My present invention relates to ring cores or formers of the type employed by tire builders to give the original shape to the green tire or carcass as the latter is built up of fabric plies stitched into conformity with the core; in particular, my invention relates to a tire former or core of the collapsible type, whereby the core may be removed from the tire interior by disassemblage of its component parts.

As a principal object, I contemplate the provision of a tire core of this general type which is composed of a number of segmental portions of corresponding cross-section, such segments being adapted to be assembled in such relation to each other as to form a complete ring upon which an annular tire carcass may be laid up, the segments being maintained in their ring assemblage by means permitting the withdrawal of any or all segments from the group, when it is desired to remove the core from the tire.

More specifically, it is an object of this invention to provide a tire core which is composed of segmental portions having hinge connections with each other in such manner that one segment may be partially swung about an adjacent segment and separated therefrom, and to provide locking means to normally prevent the movement of any segment from the ring form assumed by a locked group of the segments.

It is a still further object of this invention to provide a tire core which is composed of segmental portions having hinge connections between certain of the segments, such hinge connections being capable of disassemblage to permit separation of the sections, as well as partial rotation of one segment upon another.

It is also an object of this invention to provide a collapsible tire core which may be constructed of a material which is readily expansible upon the application of heat, in order that the core may be employed as an agent of internal expansion for the green tire carcass, when the latter is subjected to the heat of vulcanization.

The above and additional objects of a similar nature, which will be hereinafter more specifically treated, are preferably accomplished by such means as are illustrated in the accompanying drawings, described in the following specification and then more particularly pointed out in the claims which are appended hereto and form a part of this application.

With reference to the drawings, wherein there has been illustrated a preferred embodiment of the invention as it is reduced to practice, and throughout the several views of which similar reference numbers designate corresponding parts:

Figure 1 is a side elevational view of the ring core comprehended by the present invention, showing one of the stages of disassemblage of the core sections in dotted lines.

Fig. 2 is a perspective view illustrating the hinge connections between certain adjacent core sections in detail; and Fig. 3 is a cross-sectional view taken through one of the core sections on the line 3—3 of Fig. 1.

The tire core, or former, of this invention is preferably constructed of four segments, although a varying number of segments may be employed where their use guarantees advantages in the operation of the core. Each of these quarter sections is preferably constructed of some such material as aluminum, or any other metal or substance which may be found to answer the purpose by being subject to relatively great cubic expansion upon the application of heat. In cross-section, each of the core sections is similar to the others, the regular core section which conforms to the interior shape of a tire carcass being here utilized.

When my improved tire core is constructed of four segmental sections, as in the embodiment illustrated, it may be considered as being composed of two base sections 5 and 6, which are respectively terminated by the end sections 7 and 8. Both extremities of the base segments 5 and 6 are finished off in planes which include radii of the ring which is formed by the whole group of sections when the latter exist in the assembled relation illustrated by the full lines of Fig. 1. One extremity each of the terminal sections 7 and 8 is similarly finished, while the mating extremities of these two terminal sections are slant-faced in the manner indicated by the numeral 9. This mating of the terminal segments permits the removal inwardly of the section 7 from the ring form, as shown by the dotted lines 10 of Fig. 1, without disturbing the position of the segment 8 in its full line form in this figure. The segment 8 may also be removed from its full line position, as will be later explained, to the dotted line position denoted by the numeral 11.

Each of the radially mating end faces of all of the sections is provided with a face plate 12 adapted to take up the wear accruing upon the section portions during frequent assemblages and disassemblages of the segments. Each segment is provided with a rounded edge 13 which conforms to the inner tire diameter, and which narrows down along the slant lines 14 to an integral web member 15. The successive web members 15 of the separate sections are provided with grooves 16 which are adapted to mate to form a continuous annular groove when the sections are in their assembled relation. One, or more, of the adjacent extremities of the webs 15 of each pair of mated core-segments is beveled off in the manner denoted by the numeral 17. One of each pair of these adjacent web extremities is provided with an angular recess 18, while the mating web extremity 19 of the adjacent core segment is formed with an integral tongue 20 which is adapted to project within the recess during a mating of the adjacent core segments. The tongue 20 is formed with a hinge recess 21 of semi-cylindrical section, this hinge recess being adapted to encounter the similarly shaped hinge pin 22 which is fixed across the mouth of the recess 18 in the adjacent core segment.

The foregoing description of the hinge connections between adjacent segments does not apply to the slant ends of the terminal core sections 7 and 8, since no hinge connection is provided between these members of the core. The slant mating line 9 of these terminal segments is continued, at an angle, through the webs 15 of the segments along the slant line 23. These terminal segments are, however, each hingedly connected upon the separate extremities of the base sections 5 and 6, the latter being also hingedly connected at their adjacent extremities.

When it is desired to assemble the core of this invention, the tongue 20 of the base section 6 is approached and passed into the recess 18 of the section 5, with the wear plates covering the extremities of these sections angularly separated. In this manner the hinge recess 21 is seated upon the half hinge 22, and the sections are then permitted to swing about this half hinge connection until the wear plates are in contact. When thus assembled with the tongue 20 in the recess 18, the sections will resist separation except by a reverse movement of the sections about their hinge connections until their remote extremities are approached sufficiently to permit of the removal of the tongue 20 from the opposite recess 18.

Each of the terminal core sections 7 and 8 is preferably provided with the locking tongue 20 or male portion forming part of each hinge connection, while the recess 18 or female portion of the hinge connection is provided in each of the separated extremities of the base sections 5 and 6.

In continuance of the description of the assembling process, assuming that the base sections have been properly assembled as set forth, the terminal section 8 is similarly assembled upon the free extremity of the base section 6 completing a three-quarter circle of the ring core. The terminal segment 7 is then merely put into place upon the free extremity of the base section 5 and is swung until the segments 7 and 8 mate along their slant lines 9 and 23, the entire group of sections thus assuming the ring form shown in the full lines of Fig. 1. A locking ring 24, bears a central annular groove which provides an annular lug 25 to be accommodated within the complete groove 16, as the latter is formed by the successive mating of the separate segments, as illustrated in Figs. 1 and 3. The opposite annular lug 26 formed by this grooved ring 24 engages the interior diameter of the complete core and functions in coöperation with the ring lug in groove 16 to prevent any disassemblage of the core segments from their ring form, since such disassemblage must be first accompanied by a partial swinging of the successive segments upon the adjacent core sections mounting them. This requisite swinging of the segments for disassembling them is prevented when the locking ring 24 is in place.

To remove the core of this invention from the interior of a tire casing, it is necessary only to first displace the grooved annulus 24, to next swing the terminal section 7 inwardly, and then unhinge both of the end sections 7 and 8 from the remaining pair of sections, which may be immediately disconnected and removed from the tire interior.

What I claim is:

1. A core for forming tires and carcasses of tires, including a plurality of segmental sections provided with web portions and adapted to be formed into a complete core annulus; and connections provided for the removable pivotal securement of certain of the sections to adjacent sections, whereby the separate sections can be disconnected from adjacent sections and removed one at a time by merely effecting relative movement between them and the adjacent sections, such connections comprising a tongue formed on the web portion of one section to extend into an appropriate recess in the web portion of the other section, and hinge means associated with said tongue and recess.

2. A core for forming tires and carcasses of tires, including a plurality of segmental sections having web portions and adapted to be formed into a complete core annulus, said web portions provided with grooves therein; connections provided for the removable pivotal securement of certain of the sections to adjacent sections, such connections comprising a tongue formed on the web portion of one section to extend into an appropriate recess in the web portion of the other section, and hinge means associated with said tongue and recess; and a removably secured assembly ring provided with a lug fitted in said grooves to group all of the sections in their assembled relations and to maintain them therein.

3. A core for forming tires and carcasses of tires, including a plurality of separable core members having web portions and adapted to be assembled to provide a complete core annulus; a pair of adjacent members being mated along a slant line and the remaining members being mated along lines radial with respect to the core annulus, and means including tongues and recesses on the web portion providing hinge connections for removably securing the radially mated core members to each other.

4. A core for forming tires and carcasses of tires, including a plurality of separable core members having web portions and adapted to be assembled to provide a complete core annulus, said web portions provided with grooves therein; a pair of adjacent members being mated along a slant line and the remaining members being mated along lines radial with respect to the core annulus; means including tongues and recesses on the web portions providing hinge connections for removably securing the radially mated core members to each other; and an assembly ring having a lug arranged in the groove of all the members to collect and maintain them in a unitary group.

5. A forming core for tires and carcasses of tires, including separable sections having adjacent extremities of the inner portions thereof beveled, one of the sections being provided with a recess in the end extremity of its inner portion, and with a hinge pin in said recess, and the other section being provided with a tongue in the end extremity of its inner portion, said tongue being adapted to fit in said recess when the sections are assembled, and said tongue being provided with a recess to receive said pin to form a hinge connection between the sections.

6. A forming core for tires and carcasses of tires, including separable sections, one of the sections being provided with a recess in the end extremity of its inner portion, and with a hinge pin in said recess, and the other section being provided with a tongue in the end extremity of its inner portion, said tongue being adapted to fit in said recess when the sections are assembled, and said tongue being provided with a recess to receive said pin to form a hinge connection between the sections.

In testimony whereof I have signed my name in the presence of two subscribing witnesses.

CHARLES W. WATTLEWORTH.

Witnesses:
R S. Trogner,
B. J. McDanel.